Patented Mar. 13, 1951

2,544,706

UNITED STATES PATENT OFFICE 2,544,706

PHOSPHORUS- AND NITROGEN-CONTAINING COMPOUNDS

John E. Malowan, Dayton, Ohio, assignor to Monsanto Chemical Company, St. Louis, Mo., a corporation of Delaware No Drawing. Application August 12, 1948, Serial No. 43,956

3 Claims. (Cl. 260—249.6)

This invention relates to new compositions of matter and the manner of producing them. The invention relates specifically to certain insoluble compositions containing carbon, nitrogen, and phosphorus.

It is an object of the invention to provide useful materials formed as complex compositions obtained by the reaction of phosphorus pentoxide and melamine.

It is an object of the invention also to provide a composition of matter in which nitrogen and phosphorus may be present as a stable composition characterized by low solubility in water.

Another object of the invention is to provide a novel process for producing compositions of melamine and phosphorus pentoxide. Other objects will appear hereinafter.

Condensation products of ammonia with various compounds of phosphorus have been known in the past, although the products which have been obtained did not satisfy the criterion as to an insoluble product which could remain in contact with water without leaching away and which would also be alkaline instead of acid in nature. Melamine also forms salts with acids, but such compounds are acid in nature, and are soluble in water.

Because of the corrosive acidic effect of the prior art compounds of this type, it has been difficult to apply such materials in the arts, since the presence of free acid is often deleterious.

It has now been discovered that a water-insoluble form of a high molecular weight composition or complex of melamine and $P_2O_5$ may be obtained by the thermal reaction of these two materials. The resulting product appears not to be a phosphate, but is instead a complex material which is completely insoluble in organic and inorganic solvents. Even strong acids do not dissolve the complex, short of completely decomposing the material.

In a specific embodiment of the process of the present invention to produce the novel complex composition is shown the following example to illustrate the details of the said process: The complex composition of the invention was produced by mixing 3 moles of melamine with 1 mole of phosphoric anhydride. The uniformly mixed material was heated in a reaction vessel maintained at 400° C. in a muffle furnace. The fused material was cooled and then crushed and ground to a fine, white powder. The complex product so obtained is practically insoluble in water and organic solvents. The material is found to be amorphous, without any evidence of crystallinity, and to be alkaline in reaction. The product resulting from fusion appears to represent a high molecular weight material having a molecular weight of the order of several hundred, although the insolubility of the composition renders the usual cryoscopic methods inapplicable.

In general the composition of matter of melamine and phosphorus pentoxide may be prepared by the thermal reaction of these two components. It has been found that from 2 to 4 moles of melamine may be used for each mole of phosphorus pentoxide, while a preferred ratio consists of three moles of melamine to one mole of the phosphorus compound. Such mixtures in the above range of proportions of the two ingredients may be blended together and the mixture may then be fused by heating to a temperature of about 400° C. The fusion together of these materials which individually are characterized by at least appreciable water-solubility, forms a complex characterized by substantially complete insolubility in inorganic and organic solvents. The nature of this complex, as is shown by X-ray diffraction measurements, appears to be that of an amorphous substance rather than a definitely characterized crystalline material such as would result if phosphates were formed.

It has been found that the desirable products here described are obtained when the reaction temperature is maintained over the range of 300° C. to 500° C. The time of reaction is not critical as a satisfactory product is obtained when the reactants are maintained at the temperature stated for a period sufficient to permit completion of the reaction, which may be approximately 2 to 5 hours. The reaction may be carried out at atmospheric pressure such as in open pans or under pressure in a closed vessel.

The complex composition obtained by the above process may be used as a fertilizer ingredient. In this relationship it is of value because of its high concentration of nitrogen and phosphorus which in the form of the substantially insoluble complex are made slowly available to plant growth.

The melamine-phosphorus pentoxide complex may also be employed in fireproofing compositions in which it serves a useful function because of its incombustibilty, together with the provision of a high proportion of nitrogen associated with phosphorus in the molecule. The utilization of the melamine-phosphorus pentoxide complex in flameproofing compositions is the subject matter of a copending application Serial No. 43,955, filed August 12, 1948, and assigned to the same assignee as is the present case.

The complex composition of the present invention is obtained as a white powder which may also be employed as a delusterant in the fabrication of certain resins and plastic materials. Since the product is amorphous it is readily blended and combined with other ingredients to provide a smooth composition free from roughness such as may be the result of roughly crystalline materials.

Having now described certain specific forms of the invention, it is to be understood that the invention is not to be limited to the specific forms or compositions herein-described or specifically covered by the claims except insofar as limitations appear in the said claims.

What is claimed and is desired to be protected by Letters Patent of the United States is:

1. The insoluble complex composition obtained by the heating of 2 to 4 moles of melamine and one mole of phosphorus pentoxide to a temperature in the range of 300° C. to 500° C.

2. The process of manufacturing an insoluble complex composition which comprises heating together 2 to 4 moles of melamine and one mole of phosphorus pentoxide to a temperature in the range of 300° C. to 500° C.

3. The process of manufacturing an insoluble complex composition which comprises heating a mixture of three moles of melamine and one mole of phosphorus pentoxide to a temperature of about 400° C.

JOHN E. MALOWAN.

REFERENCES CITED

The following references are of record in the file of this patent:

UNITED STATES PATENTS

| Number | Name | Date |
|---|---|---|
| 2,338,987 | Watzel | Jan. 11, 1944 |
| 2,418,525 | Pollach | Apr. 8, 1947 |

FOREIGN PATENTS

| Number | Country | Date |
|---|---|---|
| 476,043 | Great Britain | 1937 |